United States Patent [19]

Klimczak

[11] Patent Number: 5,062,867
[45] Date of Patent: Nov. 5, 1991

[54] METHOD OF RETROFITTING A DUST COLLECTING APPARATUS

[75] Inventor: William J. Klimczak, Charlotte, N.C.

[73] Assignee: Dustex Corporation, Charlotte, N.C.

[21] Appl. No.: 450,854

[22] Filed: Dec. 14, 1989

[51] Int. Cl.$^5$ .............................................. B01D 46/04
[52] U.S. Cl. ...................................... 55/96; 55/302; 55/341.1
[58] Field of Search ............... 55/96, 302, 341.1, 341.6

[56] References Cited

U.S. PATENT DOCUMENTS

| | | | |
|---|---|---|---|
| 3,726,066 | 4/1973 | Colley et al. | 55/302 |
| 3,885,932 | 5/1975 | Moore, Jr. et al. | 55/314 |
| 3,942,962 | 3/1976 | Duyckinck | 55/302 |
| 4,161,389 | 7/1979 | Staffin et al. | 55/341.6 X |
| 4,306,888 | 12/1981 | Cheng | 55/96 |
| 4,443,237 | 4/1984 | Ulvestad | 55/302 X |
| 4,445,915 | 5/1984 | Robinson | 55/302 X |
| 4,578,092 | 3/1986 | Klimczak | 55/302 |
| 4,738,696 | 4/1988 | Staffeld | 55/341.1 |
| 4,759,781 | 7/1988 | Olson | 55/302 X |
| 4,854,951 | 8/1989 | Stephenson | 55/302 X |

FOREIGN PATENT DOCUMENTS 1040113 10/1978 Canada .................................. 55/302
2009625 11/1970 France .

*Primary Examiner*—Richard L. Chiesa
*Attorney, Agent, or Firm*—Bell, Seltzer, Park & Gibson

[57] ABSTRACT

A method of retrofitting a dust collecting apparatus is disclosed which has a plurality of filter bags arranged in a number of rows, and which also has a reverse pulse cleaning system. In accordance with the present invention, selected bags are rendered inactive, and the active and inactive bags are arranged in a predetermined pattern so that the active bags are shielded by the inactive bags from the particulate matter expelled from the active bags of adjacent rows during the reverse pulse cleaning operation. This shielding permits a greater volume of air to be pulsed into the active bags during cleaning, which greatly increases the degree to which the active bags are cleaned.

6 Claims, 4 Drawing Sheets

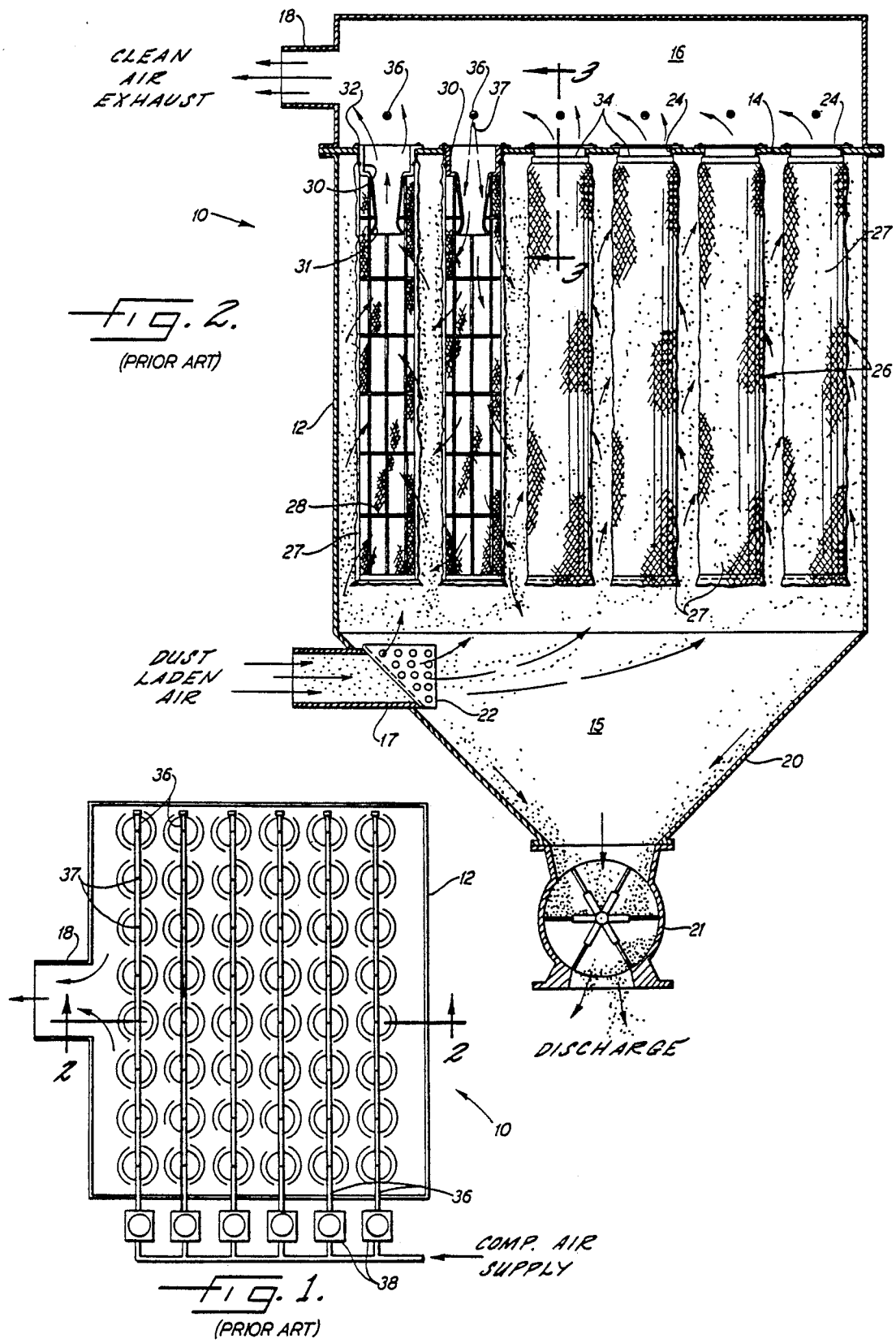

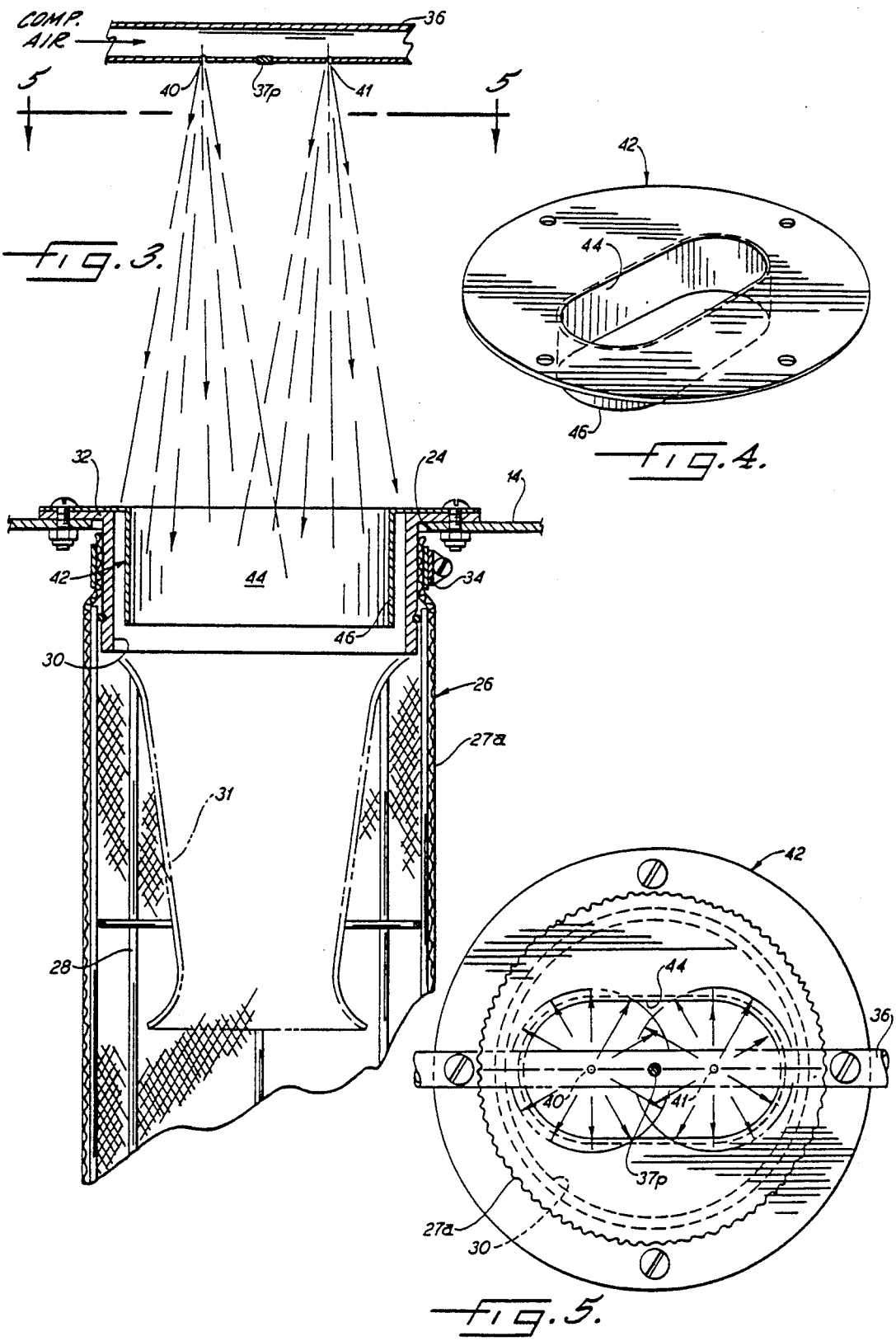

METHOD OF RETROFITTING A DUST COLLECTING APPARATUS

BACKGROUND OF THE INVENTION

The present invention relates to a dust collecting apparatus having a plurality of filter bags for filtering an airstream and wherein a jet of pressurized air is periodically injected in the reverse direction into the open end of each filter bag to expel the accumulated particles from the outside surface of the bags.

Conventional self-cleaning dust collectors of the described type typically comprise a sheet metal housing which is divided by a transverse panel having a plurality of rows of openings therein, and so that the panel defines a lower air inlet chamber and an upper air outlet chamber. Cylindrical filter elements, such as fabric filter bags, are mounted so as to be in registry with the openings and they depend downwardly into the inlet chamber. In operation, the dust laden air enters the inlet chamber and the entrained particles are deposited on the outside surfaces of the filter bags, and the filtered air flows upwardly through the inside of the bags and is discharged through the upper outlet chamber.

The filter bags are periodically cleaned by means of a pulse jet, wherein a momentary (e.g. 0.1 second) jet of high velocity compressed air is directed downwardly into each bag. More particularly, the rows of bags are pulsed in sequence, and a continuous flow of air is maintained in the filtering direction since only a small number of the bags are pulsed at any given time. Also, it is conventional to mount a Venturi nozzle in the open end of each bag so that the pulsed jet of air induces additional or secondary air into the bag with the jet of air. The resulting volume of air produces a pressure pulse which travels down the length of the bag and serves to dislodge and expel the accumulated particles on the outside surface. The dislodged particles then fall downwardly into a hopper at the bottom of the housing, where they may be removed. A dust collector of this general type is disclosed in U.S. Pat. No. 3,726,066 to Colley et al.

A problem associated with conventional collectors of the above described type is the fact that the accumulated dust particles are expelled from the pulsed bags at a high velocity, and the particles often impact adjacent bags which are not being pulsed, i.e., bags which are in normal operation. Such impacts can result in the penetration of the adjacent bag, which of course reduces its efficiency and life.

The impaction problem also limits the volume of air which can be pulsed into the filter bags, since a high volume would increase the penetration problem to intolerable levels. Thus as a practical matter the volume of air injected during the reverse pulse cleaning operation is limited, and this in turn limits the bag cleaning efficiency since insufficient air may be pulsed to remove a high percentage of the accumulated particles.

It is accordingly a object of the present invention to provide a dust collecting apparatus of the described type and which overcomes the above noted limitations and disadvantages of the prior art.

It is a more particular object of the present invention to provide a dust collecting apparatus which provides for a shielding of the filter bags from the particles expelled from the outside surface of adjacent bags during the cleaning of the adjacent bags.

It is also an object of the present invention to provide a dust collecting apparatus which permits the volume of the pulsed air to be substantially increased as compared to conventional designs, and so as to permit a high degree of cleaning of the bags.

It is still another object of the present invention to provide a method of retrofitting a dust collecting apparatus of conventional design so as to achieve the construction and advantages of the present invention.

SUMMARY OF THE INVENTION

The above and other objects and advantages of the present invention are achieved in the embodiments illustrated herein by the provision of a dust collecting apparatus which comprises a housing having a transverse panel dividing the housing into an inlet chamber and an outlet chamber, inlet opening means communicating with the inlet chamber, and outlet opening means communicating with the outlet chamber. A plurality of openings are positioned in the panel, with the openings being arranged in parallel rows of spaced apart openings, and a plurality of elongate filter bag elements are provided, each having an open end and a closed end, with the bag elements being mounted to the panel such that the open ends are in registry with respective ones of the openings in the panel. Also, the bag elements depend from the openings into the inlet chamber, and with the bag elements being arranged in separate groups of bag elements, and such that an airstream passing through the filter bag elements from the inlet chamber to the outlet chamber deposits any entrained particulate matter on the exterior surface of the filter bag elements. Reverse pulse cleaning means is provided for periodically directing reverse pulses of pressurized air into the open ends of selected active filter bag elements so as to expel accumulated particulate matter from the exterior surface of the active bag elements, and with the reverse pulses being delivered sequentially to the groups of bag elements, and such that remaining bag elements do not receive such reverse pulses of air and become inactive by reason of the buildup of accumulated particulate matter thereupon. Further, the active and inactive bag elements are arranged in a predetermined pattern such that the inactive bag elements physically shield the active bag elements from the particulate matter which is expelled from the active bag elements of the different groups of bag elements during the reverse cleaning thereof.

In the preferred embodiment, the reverse pulse cleaning means comprises an air pipe extending within the outlet chamber in spaced relation and aligned with each of the rows of openings, and the reverse pulses are delivered sequentially from row to row of the bag elements.

The present invention also involves a method of retrofitting a dust collecting apparatus of the above described conventional type, and which includes the steps of selecting a plurality of bag elements to be active filtering bag elements and the remaining nonselected bag elements to be inactive bag elements, with the active and inactive bag elements being arranged in a predetermined pattern such that the inactive bag elements physically shield the active bag elements from the particulate matter which is expelled from the active bag elements of adjacent rows during the reverse cleaning thereof. The air outlet in the air delivery pipe is then closed above all of the non-selected inactive bag elements.

In the case of collecting apparatus of the type wherein a Venturi nozzle is mounted coaxially within each bag element, the retrofitting method includes the step of removing the horn portion of the Venturi nozzle of each of the selected active bag elements. Also, the method preferably includes the steps of closing all of the air outlets in all of the air delivery pipes, and then forming a pair of spaced apart air outlets in each pipe above each of the selected active bag elements. Also, an air guide insert is mounted to the panel adjacent each one of the openings in the panel which is associated with a selected active bag element. Each of the inserts preferably includes a generally oval opening which is positioned so as to be parallel to and aligned with the associated opening in the panel, and with the major diameter of the oval opening being aligned with a line extending between the associated pair of air outlets in the associated air delivery pipe.

BRIEF DESCRIPTION OF THE DRAWINGS

Some of the objects and advantages of the present invention having been stated, others will become apparent as the description proceeds, when taken in conjunction with the accompanying drawings, in which FIG. 1 is a sectioned top plan view illustrating a dust collecting apparatus of the prior art;

FIG. 2 is a side elevation view of the apparatus shown in FIG. 1;

FIG. 3 is an enlarged fragmentary sectional view of the upper portion of one of the filtering bag elements, and which embodies the features of the present invention;

FIG. 4 is a perspective view of the air guide insert as shown in FIG. 3;

FIG. 5 is a top plan view of the filter element shown in FIG. 3, and which illustrates the air distribution pattern on the insert;

DETAILED DESCRIPTION OF THE PREFERRED EMBODIMENTS

Figure 6:
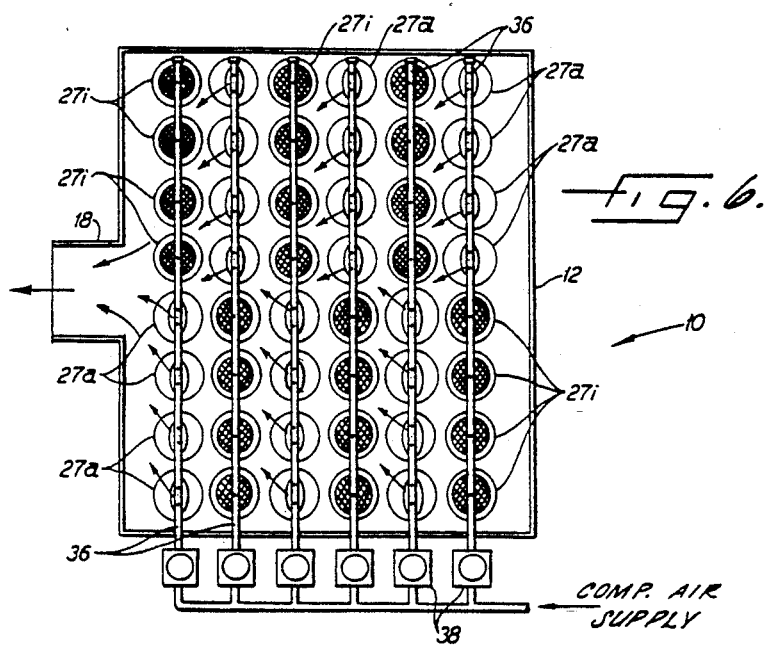
FIG. 6 is a sectional top plan view of a dust collecting apparatus which incorporates the present invention, and which illustrates the pattern of active and inactive bags.

Referring more particularly to the drawings, FIGS. 1-2 illustrate a dust collecting apparatus 10 of a construction known in the art. The apparatus 10 includes an enclosed housing 12 which is subdivided by a horizontal panel 14 which extends transversely across the housing. The panel thus divides the housing into a lower air inlet chamber 15 and an upper outlet chamber 16. Also, an inlet opening 17 communicates with the inlet chamber 15 for admitting the dust laden air, and an outlet opening 18 communicates with the outlet chamber 16 for exhausting the clean air. Further, the bottom portion of the housing defines a hopper 20, with a material discharge air lock 21 at the bottom thereof. Also, an air diffuser 22 is mounted at the outlet of the inlet opening 17 for the purposes described below.

The transverse panel 14 includes a plurality of circular openings 24 which are arranged in six longitudinal rows, each having eight spaced apart openings 24 in the illustrated embodiment. A plurality of elongate filter bag elements 26 are mounted to the panel 14 and so as to depend into the inlet chamber 15 from each opening 24. Each of the filter bag elements comprises an elongate cylindrical bag 27 of porous fabric material, and which has an open upper end and a closed lower end. Each bag 27 is supported in an open cylindrical configuration by a rigid internal wire framework or cage 28 of conventional design.

Each bag 27 is mounted to the panel so that its open end is in registry with an associated opening 24 of the panel. The mounting structure for each bag includes a Venturi nozzle which comprises a cylindrical sleeve portion 30 and an integral lower horn portion 31. The cylindrical sleeve portion 30 includes an upper flange 32 which is secured to the panel by bolts (note FIG. 3), and so that the cylindrical sleeve portion 30 and horn portion 31 are affixed coaxially to the periphery of the opening 24 in the panel 14. The wire cage 28 is attached to the lower portion of the sleeve portion 30, and the upper open end of the bag 27 extends above the cage and is clamped about the outer periphery of the sleeve portion 30 by a suitable circumferential band 34.

The illustrated apparatus of the prior art also includes reverse pulse cleaning means for periodically directing reverse pulses of pressurized air into the open ends of the filter bag elements 26, so as to expel accumulated particulate matter from the exterior surface of the bags 27. The reverse pulse cleaning means comprises an air pipe 36 extending within the outlet chamber 16 in spaced relation above and aligned with each of the rows of openings 24. Each of the pipes 36 includes outlet means in the form of a single opening 37 in the pipe which is directed toward each of the bag elements of the associated row. Each of the pipes 36 is operatively connected to a source of pressurized air via a separate valve 38, and a control arrangement of conventional design is provided (not shown) for sequentially opening the valves 38 for a short period of time.

In operation, the dust laden air enters the inlet chamber 15 via the inlet opening 17, and the diffuser 22 engages the heavier particles and causes them to be separated from the airstream and fall into the hopper 20. The remaining dust particles accumulate on the outside surface of the filter bags 27, and periodically a momentary jet of high pressure air is pulsed through the Venturi nozzles of each row of bags. The high pressure jet induces a secondary flow of air from the outlet chamber 16 into each nozzle thereby producing a reverse flow of air which expels the accumulated particles from the outside surface and thereby cleans the bags. During the pulse cleaning of each row, continuous flow is maintained through the other bags of the other rows. This is illustrated in FIG. 1, which shows the second row of bag elements from the left side being pulsed, with the bags of the remaining rows being operative.

The novel features of the dust collector of the present invention are illustrated in FIGS. 3-6, it being understood that the portions of the apparatus 10 which are not shown in FIGS. 3-6 conform to the apparatus of FIGS. 1-2. In the apparatus of the present invention, four of the bags of each row are selected to be active filtering bags, which are indicated at 27A in FIG. 6, and the remaining four bags are selected to be inactive bags as indicated at 27I in FIG. 6. Also, all of the single air outlets 37 of all of the pipes are plugged as indicated at 37P, and a pair of spaced apart openings 40, 41 are formed in each pipe 36 and which are directed toward each of the openings 24 in the panel which mount the selected active bags 27A. Thus the air delivery pipes deliver no air pulses to the selected inactive bags 27I.

The reverse pulse cleaning means also includes an insert 42 which is mounted to the panel 14 adjacent each of the openings 24 in the panel which are associated with the active bag elements 27A. Each of the inserts 42 has a generally oval opening 44 which is positioned so as to be parallel to and aligned with the associated opening 24 in the panel, and with the major diameter of the oval opening 44 being aligned with a line extending between the pair of openings 40, 41 in the associated pipe 36.

It will be appreciated that the two openings 40, 41 above each panel opening 24 which is associated with an active bag element permits a substantial volume of air to enter the bag during the reverse pulse, and which is substantially greater than the volume introduced by a single opening 37 which is conventional in the art. This added volume of air in turn results in a highly efficient removal of accumulated particulate matter from the exterior of the bag and thus effectively clears the pores the bag. Also, the oval opening 44 of the insert is configured so as to stop the conical growth of the two airstreams and so that the resulting airstream enters the bag in a substantially vertical direction. The oval configuration of the opening 44 in the insert permits the opening 44 to closely match the cross-sectional configuration of the air flow pattern from the two openings 40, 41, note FIG. 5.

As best seen in FIG. 6, the active bags 27A of each row are physically shielded from the active bags of adjacent rows by the inactive bags 27I during the reverse pulse cleaning of the active bags. In the embodiment of FIG. 6, four adjacent bag elements of each row are selected as active, with the remaining adjacent bag elements of each row being selected as inactive. Also, it will be seen that the active bag elements and inactive bag elements of adjacent rows are staggered. Thus each active bag element is physically shielded from the active bag elements of adjacent rows by the inactive bags. Clearly, other arrangements are possible, such as a "checkerboard" pattern.

Figure 7:
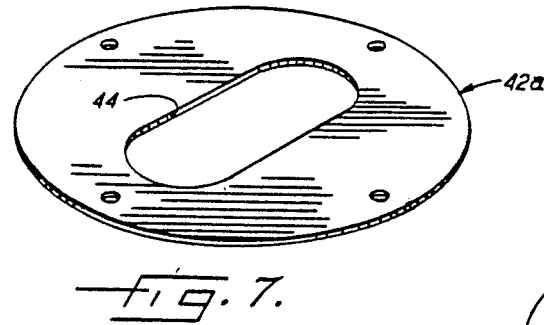
FIGS. 7-9 are perspective views of alternative embodiments of the air guide insert of the present invention.
Figure 8:
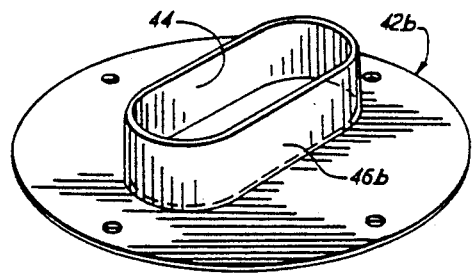
Figure 9:
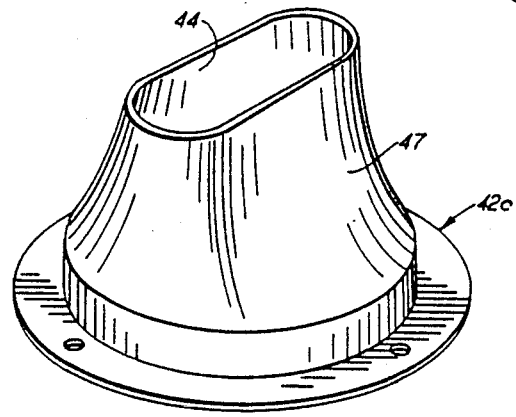

In accordance with the present invention, it has been determined that the particular location of the oval opening 44 of the insert 42 with respect to the overhead air delivery pipe 36 is of importance to permit an efficient transition from the two expanding conical air flow patterns to a vertical pattern. Also, since the present invention is suitable for use in retrofitting existing housings, where the location of the air delivery pipe is fixed, inserts of various configuration may be employed. Thus for example, the insert 42 of FIGS. 3-5 includes a depending skirt 46, whereas the embodiment of the insert 42a of FIG. 7 includes no skirt, and the embodiment of 42b in FIG. 8 includes an upstanding skirt 46b. Also, FIG. 9 illustrates an embodiment at 42c wherein a curved transition member 47 extends downwardly from the oval opening to the mounting flange.

DESCRIPTION OF THE RETROFITTING PROCEDURE

The procedure for retrofitting a dust collector of conventional design so as to embody the features of the present invention will now be described. In this regard, it will be assumed that the housing to be retrofitted is of the type illustrated in FIGS. 1-2, and includes a Venturi nozzle 30, 31 disposed in the open end of each filter bag element 26 to assist in inducing secondary air along with the pulsed air during the reverse cleaning operation.

As the first step of the retrofitting procedure, a plurality of bag elements are selected which are to remain as active bag elements, and the remaining non-selected bag elements are selected to become inactive bag elements. This selecting step includes arranging the active and inactive bag elements in a predetermined pattern such as illustrated for example in FIG. 6, and such that the inactive bag elements physically shield the active bag elements from the particulate matter which is expelled from the active bag elements of adjacent rows during the reverse cleaning thereof.

As the next step of the retrofitting procedure, the horn portion 31 of the Venturi nozzle of each active bag element is removed, as by sawing, so as to leave only the cylindrical sleeve portion 30. In this regard, FIG. 3 illustrates the removed horn portion 31 in dashed lines. Next, the single outlets 37 in the air delivery pipes 36 above all of the bag elements are closed, as indicated at 37P, and two spaced apart air outlet openings 40, 41 are formed in each pipe above each of the selected active bag elements. Thus the selected inactive elements receive no reverse air pulse during the cleaning operation, which in time, renders them inactive by reason of the buildup of particulate matter on the outside surface of the bags during operation.

Finally, the air guide insert 42 is mounted to the panel 14 adjacent each of the openings 24 which is associated with an active bag element. As noted above, the particular configuration of the insert is selected to provide an efficient transition from the two conical air patterns from the openings 40, 41 in the air delivery pipe to a unitary vertical pattern.

It will be appreciated that the resulting collector as shown in FIG. 6 has only half of the original bag elements in operation. However, with the present invention, the use of two openings 40, 41 in the air delivery pipe, and the design of the inserts 42 permit a substantially greater volume of air to be introduced during the reverse pulse cleaning operation, without risk of damage to adjacent active bag elements. This greater volume of air serves to more efficiently clean the active bag elements, and thus the active bag elements of the present invention have a higher cleaning efficiency as compared to the bag elements of conventional collectors, and this increased efficiency compensates for the reduction in numbers of bag elements.

Figure 10:
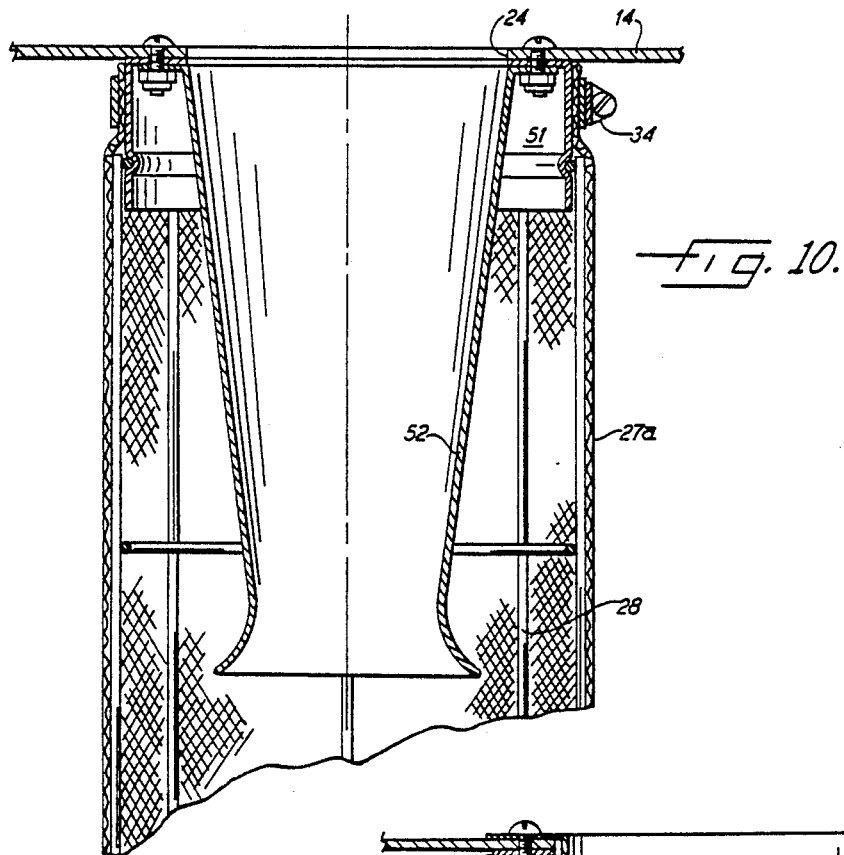
FIG. 10 is a fragmentary sectional view of the upper portion of a second embodiment of a conventional filter bag element.
Figure 11:
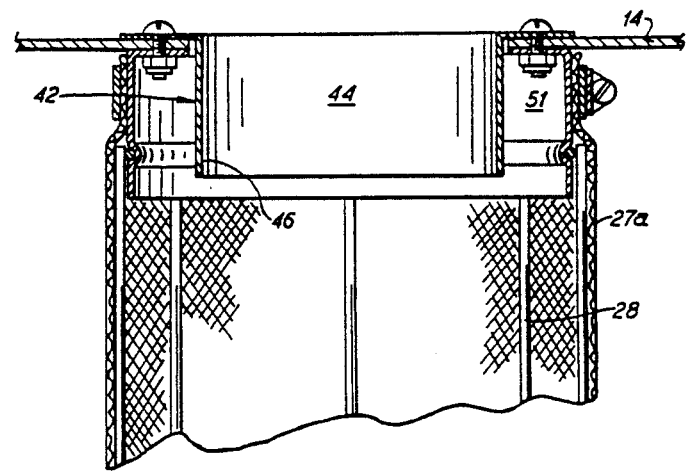
FIG. 11 illustrates the bag element of FIG. 10 which has been modified in accordance with the present invention.

FIGS. 10-11 illustrate a modified retrofitting procedure, and wherein the Venturi nozzle of the original collector comprises a cylindrical portion 51 and a separate horn portion 52 as seen in FIG. 10. Where the original collector includes nozzles of this type, the retrofitting procedure involves the simple removal of the separate horn portion 52, with the cylindrical portion 51 remaining in its original position as shown in FIG. 11. The remaining steps of the retrofitting procedure are as described above.

In the drawings and specification, there has been set forth a preferred embodiment of the invention, and although specific terms are employed, they are used in a generic and descriptive sense only and not for purposes of limitation.

That which is claimed is:

1. A method of retrofitting a dust collecting apparatus comprising a housing having a transverse panel dividing said housing into an inlet chamber and an outlet chamber, with said panel having a plurality of openings arranged in parallel rows of spaced apart openings, a plurality of elongate filter bag elements each having an open end and a closed end, with said bag elements being mounted to said panel such that said open ends are in registry with respective ones of said openings in said panel and the bag elements depend into said inlet chamber, and reverse pulse cleaning means for periodically directing a reverse pulse of air into all of the bags of each row, with said reverse pulse cleaning means comprising an air delivery pipe positioned in said outlet chamber in alignment above each of said rows of openings, each of said pipes having a single air outlet which is aligned above each opening in said panel for directing the pulse into the associated panel opening, and valve means for sequentially introducing high pressure air into each of said pipes, said method comprising the steps of selecting a plurality of the bag elements to be active filtering bag elements and the remaining nonselected bag elements to be inactive bag elements, with the active and inactive bag elements being arranged in a predetermined pattern such that the inactive bag elements physically shield the active bag elements from the particulate matter which is expelled from the active bag elements of adjacent rows during the reverse cleaning thereof, and closing the air outlet in the air delivery pipe above all of the non-selected inactive bag elements.

2. The method as defined in claim 1 wherein the selected active bag elements include about one half the bag elements along each of said rows.

3. The method as defined in claim 1 comprising the further steps of closing the air outlet in the air delivery pipe above all of the selected active bag elements, and forming a pair of spaced apart air outlets in each pipe above each of the selected active bag elements.

4. The method as defined in claim 3 comprising the further steps of mounting an air guide insert to said panel adjacent each one of the openings in said panel which is associated with a selected active bag element, with each of said inserts having a generally oval opening which has a major diameter which is aligned with a line extending between the associated pair of air outlets.

5. A method of retrofitting a dust collecting apparatus comprising a housing having a transverse panel dividing said housing into an inlet chamber and an outlet chamber, with said panel having a plurality of openings arranged in parallel rows of spaced apart openings, a plurality of elongate filter bag elements each having an open end and a closed end, with said bag elements being mounted to said panel such that said open ends are in registry with respective ones of said openings in said panel and the bag elements depend into said inlet chamber, and reverse pulse cleaning means for periodically directing a reverse pulse of air into all of the bags of each row, with said reverse pulse cleaning means comprising an air delivery pipe positioned in said outlet chamber in alignment above each of said rows of openings, each of said pipes having a single outlet which is aligned above each opening in said panel for directing the pulse into the associated panel opening, valve means for sequentially introducing high pressure air into each of said pipes, and a Venturi nozzle mounted coaxially within each bag element adjacent the open end thereof, with each Venturi nozzle comprising a cylindrical portion and a horn portion, said method comprising the steps of selecting a plurality of the bag elements in each row to be active filtering bag elements and the remaining non-selected bag elements to be inactive bag elements, removing the horn portion of the Venturi nozzle of each of the selected active bag elements, closing the single outlet in the air delivery pipe above all of the bag elements, and forming a pair of spaced apart air outlets in each pipe above each of the selected active bag elements, and mounting an air guide insert to said panel adjacent each one of the openings in said panel which is associated with a selected active bag element, with each of said inserts having a generally oval opening which is positioned so as to be parallel to and aligned with the associated opening in said panel, and with the major diameter of each oval opening being aligned with a line extending between the associated pair of air outlets in the associated pipe.

6. The method as defined in claim 5 wherein the selecting step includes arranging the active and inactive bag elements in a predetermined pattern such that the inactive bag elements physically shield the active bag elements from the particulate matter which is expelled from the active bag elements of adjacent rows during the reverse cleaning thereof.

* * * * *